(12) United States Patent
Henshaw

(10) Patent No.: US 8,739,425 B2
(45) Date of Patent: Jun. 3, 2014

(54) ENCODER SCALE MEMBER AND METHOD FOR MOUNTING

(75) Inventor: James Reynolds Henshaw, Stroud (GB)

(73) Assignee: Renishaw PLC, Wotton-under-edge (GB)

( * ) Notice: Subject to any disclaimer, the term of this patent is extended or adjusted under 35 U.S.C. 154(b) by 252 days.

(21) Appl. No.: 13/145,143

(22) PCT Filed: Feb. 16, 2010

(86) PCT No.: PCT/GB2010/000267
§ 371 (c)(1),
(2), (4) Date: Jul. 19, 2011

(87) PCT Pub. No.: WO2010/092359
PCT Pub. Date: Aug. 19, 2010

(65) Prior Publication Data
US 2011/0271540 A1  Nov. 10, 2011

(30) Foreign Application Priority Data
Feb. 16, 2009  (GB) .................................. 0902547.9

(51) Int. Cl.
*G01D 5/12* (2006.01)
*G01B 7/02* (2006.01)

(52) U.S. Cl.
USPC .............................................. 33/708; 33/706

(58) Field of Classification Search
USPC ........................................... 33/706, 707, 708
See application file for complete search history.

(56) References Cited

U.S. PATENT DOCUMENTS

| 4,137,643 A | 2/1979 | Carmel |
| 5,687,489 A | 11/1997 | Tondorf et al. |
| 5,987,768 A | 11/1999 | Freitag et al. |
| 6,463,667 B1 | 10/2002 | Ushio et al. |
| 6,769,195 B2 | 8/2004 | Huber et al. |
| 6,772,531 B1 * | 8/2004 | Henshaw et al. ................ 33/706 |
| 6,826,847 B2 * | 12/2004 | Wahl et al. ...................... 33/706 |

(Continued)

FOREIGN PATENT DOCUMENTS

| CN | A-101238356 | 8/2008 |
| DE | 33 01 037 A1 | 9/1983 |

(Continued)

OTHER PUBLICATIONS

British Search Report issued in British Application No. GB0902547.9 on Jun. 17, 2009.

(Continued)

*Primary Examiner* — Yaritza Guadalupe-McCall
(74) *Attorney, Agent, or Firm* — Oliff PLC

(57) ABSTRACT

A coordinate positioning apparatus is described. The coordinate positioning apparatus comprises a mounting surface, a motion guide mountable on the mounting surface, a first member comprising a sensor for sensing scale markings, the first member being mountable on the motion guide, and an encoder scale member comprising a first set of scale markings which are, in use, sensable by the sensor. At least part of the encoder scale member is retained between the mounting surface and the motion guide such that the encoder scale member is supported by the mounting surface at least in the vicinity of the first set of scale markings. The motion guide may be a guide rail or a bearing, for example. En encoder scale member for use with such a coordinate positioning apparatus is also described.

44 Claims, 7 Drawing Sheets

(56) References Cited

U.S. PATENT DOCUMENTS

| | | | |
|---|---|---|---|
| 7,096,595 B2* | 8/2006 | Greubel | 33/706 |
| 7,346,993 B2* | 3/2008 | McMurtry et al. | 33/1 PT |
| 7,367,128 B2* | 5/2008 | McMurtry et al. | 33/1 PT |
| 7,726,038 B2* | 6/2010 | Reusing | 33/706 |
| 7,845,092 B2* | 12/2010 | Rudy et al. | 33/706 |
| 7,895,766 B2* | 3/2011 | Rudy et al. | 33/708 |
| 8,277,122 B2* | 10/2012 | Rudy et al. | 33/710 |
| 2002/0066201 A1 | 6/2002 | Boge et al. | |
| 2002/0184782 A1* | 12/2002 | Henshaw et al. | 33/706 |
| 2005/0028394 A1 | 2/2005 | Brumbaugh | |
| 2005/0238452 A1 | 10/2005 | Botos et al. | |
| 2008/0078096 A1* | 4/2008 | Matsumura et al. | 33/706 |
| 2008/0189972 A1* | 8/2008 | Rudy et al. | 33/810 |
| 2010/0031524 A1 | 2/2010 | Schneeberger et al. | |
| 2010/0162582 A1* | 7/2010 | Shiao et al. | 33/708 |
| 2010/0175272 A1* | 7/2010 | Rudy et al. | 33/708 |
| 2011/0271540 A1* | 11/2011 | Henshaw | 33/708 |

FOREIGN PATENT DOCUMENTS

| | | |
|---|---|---|
| DE | 103 39 895 A1 | 5/2005 |
| EP | 1 752 851 A1 | 2/2007 |
| JP | U-5-081624 | 11/1993 |
| JP | A-7-213045 | 8/1995 |
| JP | A-10-506474 | 6/1998 |
| JP | A-2004-286710 | 10/2004 |
| JP | A-2006-27146 | 2/2006 |
| JP | A-2006-322811 | 11/2006 |
| WO | WO 91/16594 A1 | 10/1991 |
| WO | WO 02/25219 A1 | 3/2002 |

OTHER PUBLICATIONS

International Search Report issued in International Application No. PCT/G82010/000267 on Jun. 15, 2010.

Written Opinion of the International Searching Authority issued in International Application No. PCT/GB2010/000267 on Jun. 15, 2010.

Office Action dated Apr. 1, 2013 issued in Chinese Patent Application No. 201080007881.X (with translation).

Sep. 3, 2013 Official Notice of Rejection issued in Japanese Patent Application No. 2011-549657 (with translation).

Nov. 29, 2013 Office Action issued in Chinese Patent Application No. 201080007881.X (with translation).

* cited by examiner

ENCODER SCALE MEMBER AND METHOD FOR MOUNTING

The present invention relates to an encoder scale member for use with a coordinate positioning apparatus and a method for mounting the encoder scale member to a coordinate positioning apparatus. In particular the invention relates to an encoder scale member retainable between a motion guide and a mounting surface of a coordinate positioning apparatus.

A coordinate positioning apparatus, such as a machine tool, coordinate measuring machine, single axis measurement device, or mechanical handling or processing system, has at least two parts moveable relative to one another along or about at least one axis. Coordinate positioning apparatus includes apparatus for detecting or measuring the position of an object. For machine tools and coordinate measuring machines the axis along which the parts move relative to one another is often parallel to one of the Cartesian axes of the machine, e.g. X, Y, or Z. Metrological scale reading apparatus can be used to measure the displacement of one part relative to the other. Such metrological scale reading apparatus comprises a scale affixed to one of the parts, the scale having scale markings defining a pattern along its length, and a readhead provided on the other of the parts.

Generally, the movement of one part of a coordinate positioning apparatus relative to another is facilitated by guide assemblies. Such guide assemblies comprise a guide rail bolted to a mounting surface and a guide carriage supported on the guide rail; where the mounting surface is fixed, the guide carriage is moveable along the length of the guide rail and thus can be moved relative to the fixed mounting surface. Alternatively, where the mounting surface is moveable, the guide rail fixed to the mounting surface can be moved relative to a fixed guide carriage. As disclosed in EP1752851 it is known to mount an active magnetic scale on a lateral surface of a guide rail and to mount a readhead to a guide carriage supported on and moveable relative to said guide rail; the readhead senses the scale as it passes over it in order to measure the displacement of the guide carriage relative to the guide rail. It is also known from EP0479974 to mount a scale to the top surface of a guide rail and to provide a readhead mounted above the scale on a corresponding guide carriage.

According to a first aspect of the present invention a coordinate positioning apparatus is provided, the coordinate positioning apparatus comprising:
  a mounting surface;
  a motion guide mountable on the mounting surface;
  a first member comprising a sensor for sensing scale markings, the first member being mountable on the motion guide; and
  an encoder scale member comprising a first set of scale markings which are, in use, sensable by the sensor;
  wherein at least part of the encoder scale member is retained between the mounting surface and the motion guide such that the encoder scale member is supported by the mounting surface at least in the vicinity of the first set of scale markings.

The present invention thus provides an improved coordinate positioning apparatus. The encoder scale member can be easily retro-fitted between an existing motion guide and mounting surface, or replaced, without affecting relative movement of the motion guide and first member.

The mounting surface is a surface on which the motion guide may be mounted. The mounting surface could be a bed of a coordinate positioning apparatus, such as the bed of a machine tool or the bed of a coordinate measuring machine. Such a mounting surface is capable of supporting workpieces and other loads.

The motion guide mountable on the mounting surface may be attachable to the mounting surface. The motion guide mountable on the mounting surface may be securable to the mounting surface, for example using mounting fixtures such as bolts. The motion guide can be a linear, curved, or circular member. The motion guide may be a guide rail. Linear guide rails are described in EP 1752851 herein incorporated by reference thereto. The motion guide may be a bearing assembly such as a ball bearing assembly, a plane bearing, or a roller bearing. Other types of bearings are known to the skilled person.

Preferably the motion guide has a planar mounting surface for positioning on the mounting surface of the coordinate positioning apparatus.

The first member is conveniently moveable along or around the motion guide. At least one roller or ball member can be provided between the motion guide and the first member to facilitate movement of the first member relative to the motion guide. Other means may be provided to facilitate movement of the first member relative to the motion guide. Where the motion guide is a bearing, the bearing may comprise a moveable portion and a stationary portion. Said moveable portion may be moveable relative to the stationary portion. One of the stationary portion and the moveable portion may be mountable on the mounting surface, or attachable to the mounting surface. The first member may be mountable on the other of the stationary portion or moveable portion of the bearing. The bearing may thus enable movement of the first member relative to one of the stationary or moveable portions of the bearing. Preferably the moveable portion of the bearing is mountable on the mounting surface, or attachable to the mounting surface, and the first member is mountable on the stationary portion of the bearing. By keeping the first member stationary the problem of maintaining power to the sensor whilst the sensor is moved is avoided.

In these ways the sensor on the first member, when mounted on the motion guide, and the first set of scale markings on the scale member can be moved relative to one another. The position of the first member relative to the motion guide and thus to the mounting surface can thus be determined.

A guide rail may be a solid rail having a grooves provided on either side of the rail. Said grooves can receive rollers or balls for supporting the first member. The first member may be a carriage. The carriage can be moveable relative to the guide rail on the rollers or balls.

The encoder scale member can be an elongate flexible member comprising a first set of scale markings. The encoder scale member may be linear or curved or circular.

Where the encoder scale member is supported by the mounting surface the encoder scale member can be in contact with the mounting surface. Alternatively, the encoder scale member can be supported on the mounting surface via an intermediate member. In this case the encoder scale member does not need to be in direct contact with the mounting surface.

Where the encoder scale member is supported by the mounting surface at least in the vicinity of the first set of scale markings the scale member may be supported on the mounting surface in position near to a portion of encoder scale member in or on which the first set of scale markings are provided. For example, the encoder scale member may be supported on the mounting surface by a face of the encoder scale member opposed or directly opposed to the face of the encoder scale member in or on which the first set of scale markings are provided. Alternatively, the encoder scale member may be supported on the mounting surface on part of the encoder scale member adjacent to the part of the encoder scale member in or on which the first set of scale markings are provided. By supporting the encoder scale member the mounting surface may prevent deformation of the scale member in the region of the scale markings due to gravity or other forces. The mounting surface may support the scale member when the scale member and mounting surface are in any relative orientation, such as for example, the scale member lays on-top of the mounting surface, or the scale member lies under the mounting surface.

The encoder scale member can be retained between the mounting surface and the motion guide solely by the motion guide. The encoder scale member can be retained between the mounting surface and the motion guide by mounting fixtures. The motion guide may be provided with at least one mounting fixture to assist retention of the encoder scale member between the mounting surface and the motion guide. Alternatively, the encoder scale member can be retained between the mounting surface and the motion guide by the motion guide in combination with at least one separate mounting fixture. The encoder scale member can be retained between the mounting surface and the motion guide along a first edge portion of the encoder scale member. A second edge portion of the encoder scale member may be retained by at least one further mounting fixture such as, for example, a clip or a clamp. Said clip or clamp may be attachable to the mounting surface of the coordinate positioning apparatus.

The encoder scale member may comprise further scale markings. Said further scale markings may also be sensable by the sensor when the encoder scale member is retained between the mounting surface and the motion guide such that the encoder scale member is supported by the mounting surface at least in the vicinity of the first set of scale markings. The description of the first set of scale markings included herein may be applied to any further scale markings provided on the encoder scale member.

The encoder scale member may comprise at least one mounting feature such that the encoder scale member can be mounted to the mounting surface of the coordinate positioning machine. Said at least one mounting feature may comprise at least one mounting hole. Said at least one mounting feature of the encoder scale member may comprise at least one mounting slot. Additionally, the motion guide may comprise at least one mounting feature.

Conveniently, at least one mounting feature can be provided on each of the encoder scale member and the motion guide. Advantageously any mounting features on the encoder scale member can be provided at corresponding locations to any mounting features on the motion guide. Where there is more than one mounting feature on each of the encoder scale member and the motion guide the mounting features on each of the encoder scale member and the motion guide can be spaced at corresponding distances. More conveniently, the mounting surface is also provided with at least one mounting feature located to correspond with the mounting features on the encoder scale member and the motion guide. The mounting surface may be provided with more than one mounting feature spaced to correspond with the more than one mounting features on each of the encoder scale member and the motion guide. These features are particularly convenient where the motion guide is a guide rail.

Advantageously, at least one attachment part is provided. Preferably said at least one attachment part is cooperable with the at least one mounting feature on the encoder scale member and with the at least one mounting feature on the motion guide to fix the encoder scale member and the motion guide to the mounting surface of the coordinate positioning apparatus.

The at least one attachment part may comprise, for example, mounting bolts, cap screws or other mounting fixtures. Where the at least one mounting feature of the encoder scale member comprises at least one mounting slot, each slot may be shaped and sized to position around each attachment part such that the encoder scale member can be retrofitted between a motion guide and a mounting surface without completely removing the motion guide from the mounting surface. This is particularly useful where the motion guide is a guide rail.

The encoder scale member may have first and second opposing faces. Advantageously the first face is supported by the mounting surface and at least part of the second face contacts the motion guide. The entire of the first and second faces need not be in contact with the mounting surface of the coordinate positioning apparatus and the motion guide respectively. In fact, the encoder scale may be divided into two portions, a first portion which in use lies directly between the mounting surface and the motion guide and a portion which in use protrudes from under the motion guide.

The first face may be substantially parallel to the second face. In this case the thickness of the encoder scale member can be substantially uniform. The first and second faces may converge or diverge in any plane.

Preferably the first set of scale markings is provided on at least the second face of the encoder scale member. In particular the first set of scale markings may be provided on a portion of the second face which in use is not in contact with the motion guide. In this case the portion of the encoder scale member in or on which the first set of scale markings are made protrudes from between the motion guide and mounting surface when retained between the motion guide and the mounting surface of a coordinate positioning apparatus.

The sensor is mounted to the first member, which in turn may be mounted to the motion guide. The sensor can be positioned at a fixed distance away from the second face of the encoder scale member and thus a fixed distance away from the first set of scale markings. When the mounting surface is a substantially plane surface (i.e. the surface may deviate locally, for example with depressions in the surface, but overall a plane geometry is preserved) and has a known position the substantially uniform thickness of the encoder scale member, when mounted on the mounting surface, may result in the second face of the encoder scale member having a known position. The position of the first set of scale markings can thus be known relative to the mounting surface. Where the motion guide has known dimensions the position of the motion guide, and the first member and sensor supported on it, can be determined relative to the first set of scale markings and the mounting surface when the motion guide is mounted on the encoder scale member. The position of a sensor supported on the first member and motion guide can thus be accurately defined at a substantially constant distance from the encoder scale member and thus from the first set of scale markings. The sensor can be mounted as closely as possible to the first set of scale markings without risking hitting the first set of scale markings or encoder scale member as it is moved along the first set of scale markings. The ability to get close to the first set of scale markings can allow a greater range of measured values to be obtained by sensing first set of scale markings with the sensor; this can result in increased accuracy of measurement data obtained. The sensor is preferably an encoder readhead for reading encoder scale markings.

Preferably the encoder scale member is sufficiently thin that the mounting surface is its master, i.e. the encoder scale member follows the form of the mounting surface. Conveniently the encoder scale member is substantially more flexible than the mounting surface and the motion guide. The encoder scale member can be less than 1 cm thick; the encoder scale member can be less than 0.5 cm thick. However, it will be understood that the encoder scale member may be thicker than 1 cm depending on the size of the application. The encoder scale member may be, for example, in strip form, or in tape form, where scales having a tape form can be thinner than scales having a strip form.

The encoder scale member may have third and fourth faces. Said faces are preferably substantially perpendicular to the first and second faces; however, they do not have to be. The third and fourth faces may be at an acute or obtuse angle to the first or second faces of the encoder scale member. The third and forth faces may converge or diverge. Further faces may be provided.

The third and fourth faces may, for example, run along the length of a linear scale, or along the path of a curved or rotary scale. The first set of scale markings may be provided on at least one of said third and fourth faces. In this case, when the encoder scale member is mounted between the mounting surface and the motion guide the first set of scale markings can be provided on a face substantially perpendicular to the mounting surface. Here, even if the width of the encoder scale member is less than or substantially equal to the width of the motion guide such that the motion guide contacts the entire width of the second surface, the first set of scale markings are positioned such that they can be sensed by a sensor supported on a first member which is in turn supported on the motion guide.

Preferably the first set of scale markings are made directly into or onto the encoder scale member. The first set of scale markings may be made in the encoder scale member, for example by etching material out of the encoder scale member. The encoder scale member may comprise a coating over the first set of scale markings. Such a coating may be, for example, a ceramic coating. Any coating may follow the form of the first set of scale markings or may alternatively level off so as to provide a substantially flat surface over the first set of scale markings.

The first set of scale markings may be made on the encoder scale member, for example by addition of material at selected locations on the encoder scale member.

Preferably the encoder scale member has a datum edge for alignment of the scale against, for example, an edge on the mounting surface or an edge of the motion guide. The datum edge does not have to be a continuous edge. The datum edge could, for example be provided by datum features spaced along an edge of the encoder scale member; this can make it easier to provide a datum edge against which to align the scale as the whole of the edge does not have to be accurately machined.

Preferably the first set of scale markings are made into or onto the encoder scale member relative to the datum edge. More preferably, the first set of scale markings are made perpendicular to the datum edge and are arranged in a direction parallel to the datum edge.

The first set of scale markings may be arranged to form at least one scale track. Further scale markings may be included within said at least one scale track. Alternatively the first set of scale markings may be provided in any other arrangement of markings to be sensed by a sensor. Where the first set of scale markings are arranged to form at least one scale track, preferably the scale track runs parallel to the datum edge of the encoder scale member.

A scale track provides position information which can be read or sensed by an associated sensor. The first set of scale markings may provide, for example, absolute position information or incremental position information when read or sensed by an associated sensor. The first set of scale markings may be arranged to form a plurality of scale tracks, for example a plurality of absolute, incremental, or reference mark tracks, or any mixture of types of scale tracks. The scale markings of an incremental scale are provided in a periodic pattern; together with a readhead incremental scale markings provide an output of up and down counts. Such a scale may additionally be provided with reference marks which, when detected by a readhead, enable the exact position of the readhead to be determined. The reference marks may be provided in the same scale track as the incremental scale markings, or in a separate scale track. Absolute scale markings provide absolute code marks which enable a readhead to determine its absolute position anywhere on the scale.

The first set of scale markings are preferably magnetic scale markings. Such magnetic scale markings may be, for example, passive magnetic scale markings or active magnetic scale markings. Passive magnetic scale markings are generally provided by grooves made in a magnetic material. When the sensor is set at a fixed height above the encoder scale member and scale markings are indented into the encoder scale member the distance between the sensor and the magnetic material is different for different scale markings. As the distance between the magnetic material and the sensor changes the reluctance of the magnetic circuit changes, such that the magnetic field strength measured by the sensor varies as the sensor moves over the different scale markings. Passive magnetic scale markings may be formed by adding material to the encoder scale member instead of indenting into it. Any form of passive magnetic marking which results in a variation in magnetic field strength measured by the sensor as the sensor is moved over the different markings can be used.

The sensor may comprise at least one Giant Magnetoresistive sensor (GMR sensor), at least one Anisotropic Magnetoresistive sensor (AMR sensor) or at least one Hall sensor. Advantageously the sensor comprises at least one Hall sensor. The sensor may further comprise a permanent magnet. Providing a permanent magnet allows the sensor to sense passive magnetic scale markings.

As the sensor is moved along the scale markings it outputs a sine and cosine signal based on the detected magnetic signature of the scale; these signals can be interpolated to determine the movement of the sensor relative to the scale.

In the case of active magnetic scale markings the markings are magnetised, for example with alternating N and S magnetisation. No magnet is required in the sensor for sensing active magnetic scale markings.

Passive magnetic scale markings can be more robust than other types of scale markings and thus passive magnetic scales are particularly advantageous in a dirty machine tool environment. Passive magnetic scale markings, together with magnetic scale reading apparatus, are able to deliver reliable readings in hostile environments such as in dusty, dirty, greasy and destructive applications.

The first set of scale markings may alternatively comprise optical scale markings, such as amplitude or phase scale markings. The scale pattern of amplitude scale markings is made from two different types of sections; a first type of section reflects incident light to the readhead and the second type of section does not. In contrast, different phase scale markings can reflect light at different phases when detected at the readhead. A readhead for reading optical scale markings is provided with a light source, for example a light emitting diode (L.E.D.), for illuminating the scale, and a detecting responsive to a resultant light pattern to produce a measure of relative displacement of the scale and readhead. The encoder scale may alternatively comprise a capacitance scale or an inductive scale.

The sensor may be adapted for use with a liquid support as described in WO 02/25219. The scale markings and sensor may be adapted for mutual optical communication via a liquid. The scale and sensor may both be adapted for use with a liquid between the scale and the sensor. The scale and sensor may be separated during respective relative movement by a thin film of liquid.

The sensor may include a transparent window, on which may be formed a grating. The scale may be elongate and have a generally flat surface. The window may be free to move with respect to a support in order to accommodate deviations in the flatness of the scale surface, but movement in a plane parallel to the plane of the scale surface may be constrained. Thus this partial movement allows the window to move to follow any undulations in the flatness of the scale but its position relative to its direction of travel along the scale, side-to-side and yaw motion are controlled.

The surface of the window nearest the scale, in use, may have a scratch resistant coating, possibly a diamond-like carbon (DLC) coating. The sensor may include at least one wiper element in front of the window in the direction of travel. This element may be an absorbent pad for wetting the scale and/or removing debris. The sensor may have a supply for liquid.

The scale and sensor may be adapted for mutual contact. The mutual contact may take place in the absence of liquid. A sensor and scale as described in this and the preceding three paragraphs is described in WO 02/25219.

The encoder scale member can be a linear encoder scale member or an encoder scale member having a radius of curvature. An encoder scale member having a radius of curvature may be a rotary encoder scale member. A number of encoder scale members having a radius of curvature may be used together to form a loop or ring, or alternatively to form a partial loop or ring. A single encoder scale may form a loop or ring, or a partial loop or ring. A loop or ring may be, for example circular, quasi-circular, or oval. A partial loop or ring may be, for example, part circular, or part quasi-circular. The motion guide may have a similar shape to the encoder scale member.

A linear encoder scale member is preferably retained between the mounting surface and a linear motion guide. An encoder scale member having a radius of curvature is preferably retained between a motion guide having a radius of curvature and the mounting surface. More preferably the radius of curvature of the encoder scale member corresponds to the radius of curvature of the motion guide.

Preferably, the coordinate positioning apparatus is a machine tool. Alternatively the coordinate positioning apparatus may be, for example, a coordinate measuring machine, single axis measurement device, or mechanical handling or processing system. The coordinate positioning apparatus may be, for example, a position determining apparatus or position measuring apparatus.

According to a second aspect of the present invention an encoder scale member is provided, for use with a coordinate positioning apparatus comprising a mounting surface, a motion guide mountable to the mounting surface, and a first member comprising a sensor for sensing scale markings, the first member being mountable on the motion guide, said encoder scale member comprising:
  a first set of scale markings which are, in use, sensable by the sensor; and
  at least one mounting feature that allows at least part of the encoder scale member to be fixed between the mounting surface and the motion guide such that the encoder scale member is supported by the mounting surface at least in the vicinity of the first set of scale markings.

At least one attachment part can cooperate with the at least one mounting feature of the encoder scale member, to fix the at least part of the encoder scale member between an associated mounting surface and a motion guide. Said at least one mounting feature can comprise at least one mounting hole for receiving at the least one attachment part. Alternatively the at least one mounting feature can comprise at least one mounting slot for fitting around the at least one attachment part.

Preferably the encoder scale member has first and second opposing faces. Conveniently the first face is substantially parallel to the second face.

The first set of scale markings can be provided on at least one of said first and second faces. Preferably, the first set of scale markings are provided on the second face of the encoder scale member. The first set of scale markings can be arranged to form at least one scale track, as discussed hereinbefore.

The first set of scale markings can be magnetic scale markings. Preferably the first set of scale markings are passive magnetic scale markings.

The encoder scale member can be a linear encoder scale member or an encoder scale member having a radius of curvature.

According to a third aspect of the present invention a method is provided for mounting an encoder scale member to a coordinate positioning apparatus comprising a mounting surface, a motion guide mountable to the mounting surface, and a first member comprising a sensor for sensing scale markings, the first member being mountable on the motion guide, the encoder scale member comprising a first set of scale markings which are, in use, sensable by the sensor, the method comprising the steps of:
  (i) taking the mounting surface, motion guide and encoder scale member; and
  (ii) positioning at least part of the encoder scale member between the mounting surface and the motion guide such that the encoder scale member is supported by the mounting surface at least in the vicinity of the first set of scale markings.

Advantageously, the step of positioning at least part of the encoder scale member between the mounting surface and the motion guide such that the encoder scale member is supported by the mounting surface in the vicinity of the first set of scale markings further comprises the steps of:
  (i) positioning the encoder scale member on the mounting surface of the coordinate positioning apparatus such that the encoder scale member is supported by the mounting surface at least in the vicinity of the first set of scale markings;
  (ii) positioning the motion guide on the encoder scale member such that the at least a part of the encoder scale member lies between the motion guide and the mounting surface of the coordinate positioning apparatus.

The encoder scale member may be stored in a coiled configuration. Where the encoder scale member is a coiled encoder scale member, the step of positioning the encoder scale member on the mounting surface of the coordinate positioning apparatus such that the encoder scale member is supported by the mounting surface at least in the vicinity of the first set of scale markings may comprise uncoiling the encoder scale member and laying it on the mounting surface. Preferably the encoder scale member has a natural tendency to uncoil.

The method may comprise the additional step of fixing the motion guide and encoder scale member to the mounting surface of the coordinate positioning apparatus.

The mounting surface, motion guide and encoder scale member may each comprise mounting holes and the step of fixing the motion guide and encoder scale member to the mounting surface of the coordinate positioning apparatus comprises bolting the motion guide and encoder scale member to the mounting surface of the coordinate positioning apparatus. This is particularly convenient where the motion guide is a guide rail.

The method may comprise the initial step of releasably fixing the motion guide to the mounting surface of the coordinate positioning apparatus. In this case, the step of mounting at least part of the encoder scale member between the mounting surface and the motion guide such that the encoder scale member is supported by the mounting surface at least in the vicinity of the first set of scale markings may further comprise the steps of:
(i) at least partially releasing the motion guide from the mounting surface of the coordinate positioning apparatus; and
(ii) at least partially separating the motion guide from the mounting surface of the coordinate positioning apparatus.

The method may further comprise the step of re-fixing the motion guide to the mounting surface of the coordinate positioning apparatus.

The motion guide can be releasably fixed to the mounting surface of the coordinate positioning apparatus with at least one attachment part. The encoder scale member can comprise at least one mounting slot for fitting around the at least one attachment part.

For the methods described herein, the coordinate positioning apparatus is preferably a machine tool.

According to a fourth aspect of the present invention a coordinate positioning apparatus is provided, the coordinate positioning apparatus comprising:
a mounting surface;
a motion guide mountable to the mounting surface;
a first member for supporting a sensor for sensing scale markings, the first member being mountable on the guide rail; and
an encoder scale member comprising scale markings;
wherein at least part of the encoder scale member is retained between the mounting surface and the motion guide, a substantial part of the encoder scale member being supported by the mounting surface.

Preferably the coordinate positioning apparatus is a machine tool. The scale markings may be as described with reference to the first set of scale markings above. A substantial part of the scale member may comprise, for example, a portion of the width of the scale member along a substantial part of the length of the scale member. A substantial part may comprise a substantial part of the width of the scale member along the length of the scale member. The substantial part may be made up of sections; it does not have to be one continuous substantial part.

Preferred embodiments of the invention will now be described, by way of example only, with reference to the accompanying drawings wherein:

FIG. 2b shows a cross-section through the linear encoder scale 30 shown in FIG. 2a;

Figure 1A:
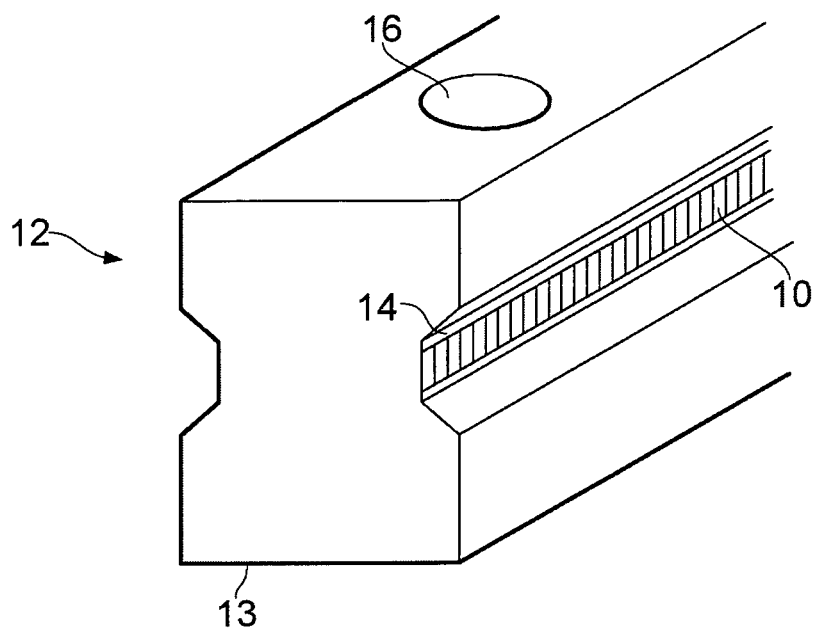
FIG. 1a shows an isometric view of an encoder scale mounted to a guide rail of a guide assembly in a known way and FIG. 1b shows a cross-section through a guide assembly, the guide assembly comprising the guide rail shown in FIG. 1a, mounted to the bed of a machine tool.
Figure 1B:
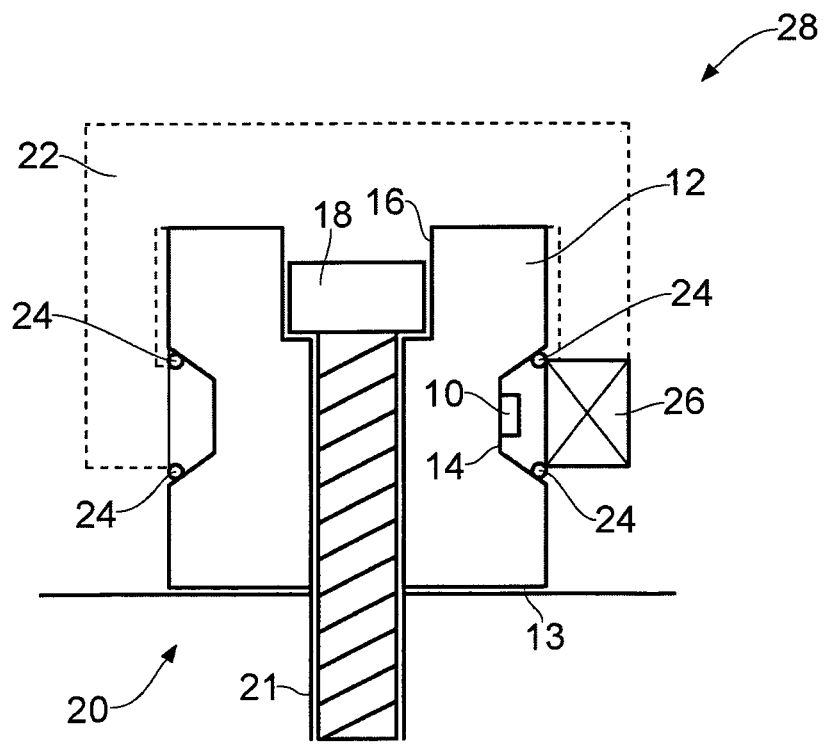

FIG. 1a shows an isometric view of an encoder scale 10 mounted to a guide rail 12 of a guide assembly in a known way. FIG. 1b shows a cross-section through a guide assembly 28 mounted to the bed 20 of a machine tool; the guide assembly 28 comprising the guide rail 12, and a guide carriage 22 mounted over the guide rail 12 and displaceable along the length of guide rail 12 on roller or ball elements 24.

The guide rail 12 comprises a mounting surface 13 and a lateral surface 14 extending along the length of the rail, the mounting surface 13 being substantially perpendicular to the lateral surface 14. The encoder scale 10 is glued to the lateral surface of the guide rail 12. On small guide rails it can be difficult to find space in which to mount a scale to a lateral surface, or any other surface, of the guide rail. Additionally, gluing the encoder scale 10 to the guide rail 12 can be particularly cumbersome when dealing with long sections of scale. It is difficult to obtain a uniform thickness of glue and thus the scale may not lie flat on the side of the guide rail. As a consequence the distance between the scale and a sensor provided for sensing the scale may vary along the length of the scale, leading to inaccuracies in measurements of the relative positions of the sensor and the scale. The guide rail 12 is provided with a plurality of bolt holes 16 spaced apart along its length; in order to fix the mounting surface 13 of the guide rail 12 to the bed 20 of the machine tool bolts 18 are passed through the bolt holes 16 and into correspondingly spaced holes 21 in the bed 20.

A readhead 26, for sensing the scale 10, is mounted to the guide carriage 22 such that the readhead sensor is directed towards the lateral surface 14 of the guide rail 12, and thus towards the scale 10. The readhead 26 must be aligned with the scale 10 in order to be able to provide accurate measurements of the relative displacement of the guide carriage 22 with respect to the guide rail 12; this alignment process can be challenging and time consuming.

Figure 2A:
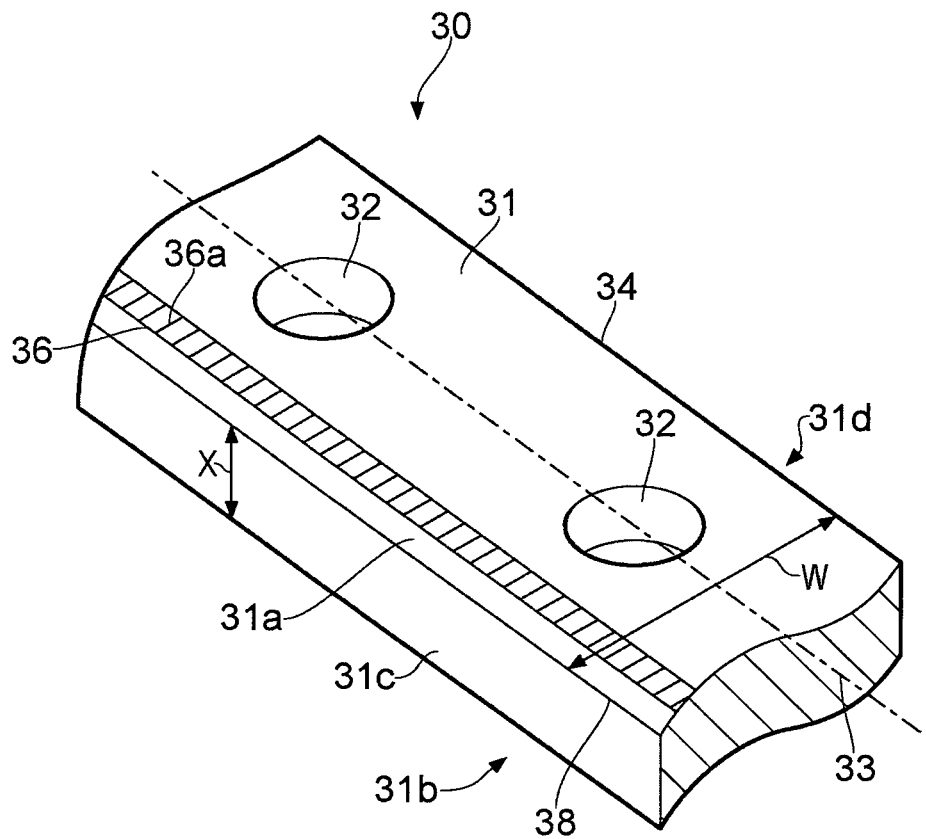
FIGS. 2a, 2c and 2d show isometric views of various linear encoder scales for mounting between a guide rail and the bed of a machine tool.
Figure 2B:
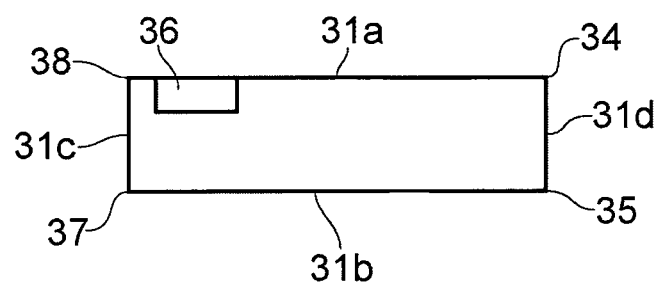
Figure 2C:
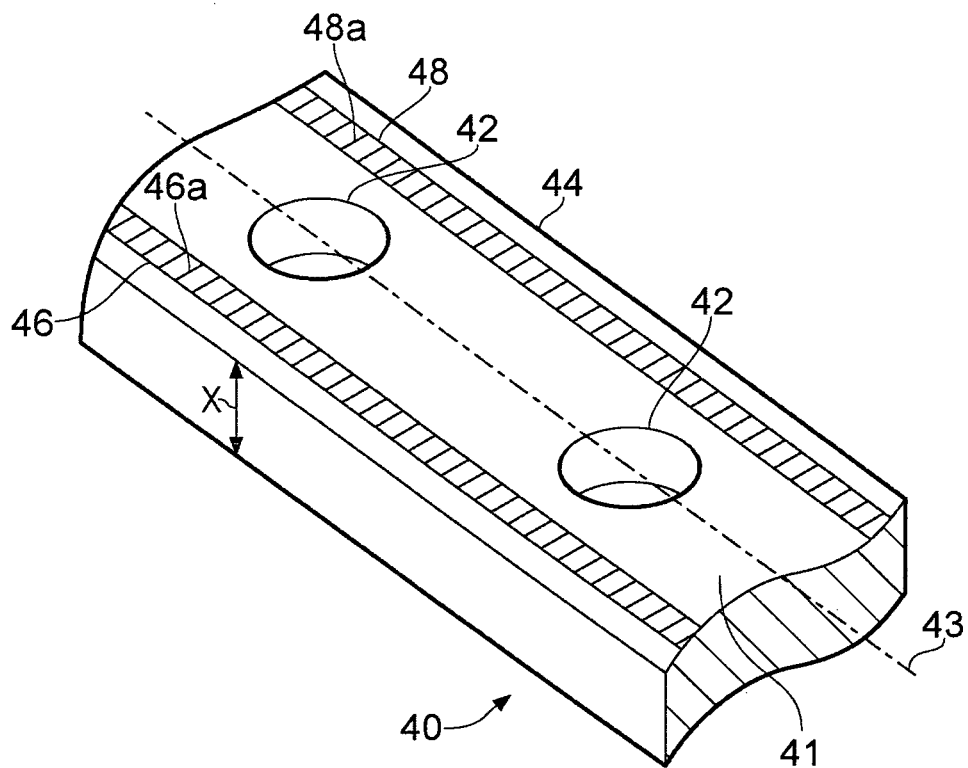
Figure 2D:
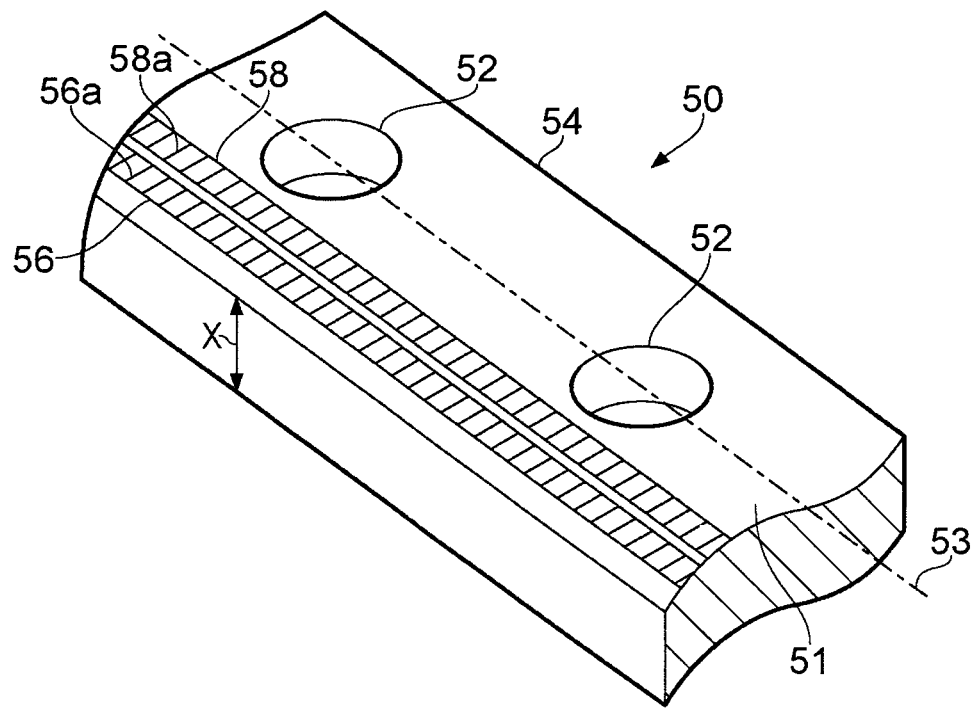

FIGS. 2a, 2c and 2d show isometric views of sections along the length of various linear encoder scales 30,40,50 for mounting between a guide rail and a machine tool bed. The encoder scales 30,40,50, comprise an elongate scale member 31,41,51, and at least one scale track 36,46,48,56,58 comprising scale markings 36a,46a,48a,56a,58a. The scale members 31,41,51, have a notional longitudinal centreline 33,43,53. FIG. 2b shows a cross-section through the linear encoder scale 30 shown in FIG. 2a.

The encoder scale 30 shown in FIGS. 2a and 2b comprises a scale member 31 which has a substantially rectangular cuboid shape and a substantially rectangular cross-section.

The scale member has two pairs of opposing faces, a larger pair of opposing faces being the upper 31a and lower 31b faces as shown, and a smaller pair of opposing faces being first and second side faces 31d,31c as shown. The upper 31a and lower 31b faces meet the side faces 31d,31c at longitudinal edges of the scale member 34,35,37,38. It will be understood however that the encoder scale 30 could be used in a different orientation to that shown in FIGS. 2a and 2b, in which case the references to upper, lower and side faces herein will no longer apply.

The upper and lower opposing faces 31a,31b define the length and width W of the scale member, whilst the side opposing faces 31c,31d define the length and thickness X of the scale member 31. The upper and lower opposing faces 31a,31b are substantially parallel such that the thickness X of the scale is substantially uniform along the length of the scale member 31. One longitudinal edge of the scale member 31 acts as a datum edge 34; the scale markings 36a of the scale track 36 are made directly into or onto the scale member 31 relative to this datum edge 34. In this way the scale markings 36a are an integral part of the scale member 31. When the scale 30 is mounted with the datum edge 34 substantially parallel to the axis of relative movement between a readhead and the scale 30, the accuracy of the reading taken from the scale markings 36a is as close as possible to the accuracy with which the scale markings 36a were made; thus minimising errors in the measurement signal output. The datum edge 34 is useful for aligning the scale member 31 with an edge of a groove made in a machine tool bed and in this way also aligning the scale member 31 with the edge of a guide rail which is also aligned with the edge of the groove in the machine tool bed.

The scale track 36 is provided on the upper face 31a of the scale member 31, offset from the notional longitudinal centreline 33 in a direction away from the datum edge 34. The scale track 36 is provided substantially parallel to the datum edge 34 such that the scale markings 36a are substantially perpendicular to the datum edge 34.

The scale member 31 is provided with bolt holes 32, spaced apart along its length, through which bolts may pass in order to secure the scale 30 to a machine tool bed. The bolt holes 32 are spaced to correspond to the spacing between bolt holes in a guide rail, which in turn correspond to bolt holes a machine tool bed, such that the scale 30 can be secured between the guide rail and machine tool bed. The bolt holes 32 in the scale member 31 are slightly larger than the bolt holes in the guide rail and in the machine tool bed so that the bolt holes 32 in the scale member 31 do not have to be precisely located.

The general description with reference to the encoder scale 30 shown in FIG. 2a can be applied to the encoder scales 40 and 50 shown in FIGS. 2c and 2d respectively. Reference numeral 31 in FIG. 2a, for example, corresponds to reference numerals 41 and 51 in FIGS. 2c and 2d respectively.

The encoder scale 40 shown in FIG. 2c is provided with two scale tracks 46,48 on the scale member 41. In this embodiment one scale track 46 is provided offset from the notional longitudinal centreline 43 in a direction away from the datum edge 44 of the scale member 41, and the other scale track 48 is provided offset from the notional longitudinal centreline 43 in a direction towards the datum edge 44 of the scale member 41. In this case the scale tracks 46,48 may be read by two separate sensors when in use, one positioned on either side of the guide rail which is mounted on top of the scale.

The encoder scale 50 shown in FIG. 2d is also provided with two scale tracks 56,58 on the scale member 41. In this embodiment both scale tracks 56,58 are offset from the notional longitudinal centreline 53 in a direction away from the datum edge 54 of the scale member 51. In this case the two scale tracks 56,58 can be read by the same sensor, or by separate sensors.

The pairs of scale tracks 46,48 and 56,58 could be, for example, one incremental scale and one reference mark scale, or two absolute scales running in opposite directions.

It will be understood that as an alternative to a datum edge 34, a datum face may be provided, for example the first side face 3d.

Figure 3:
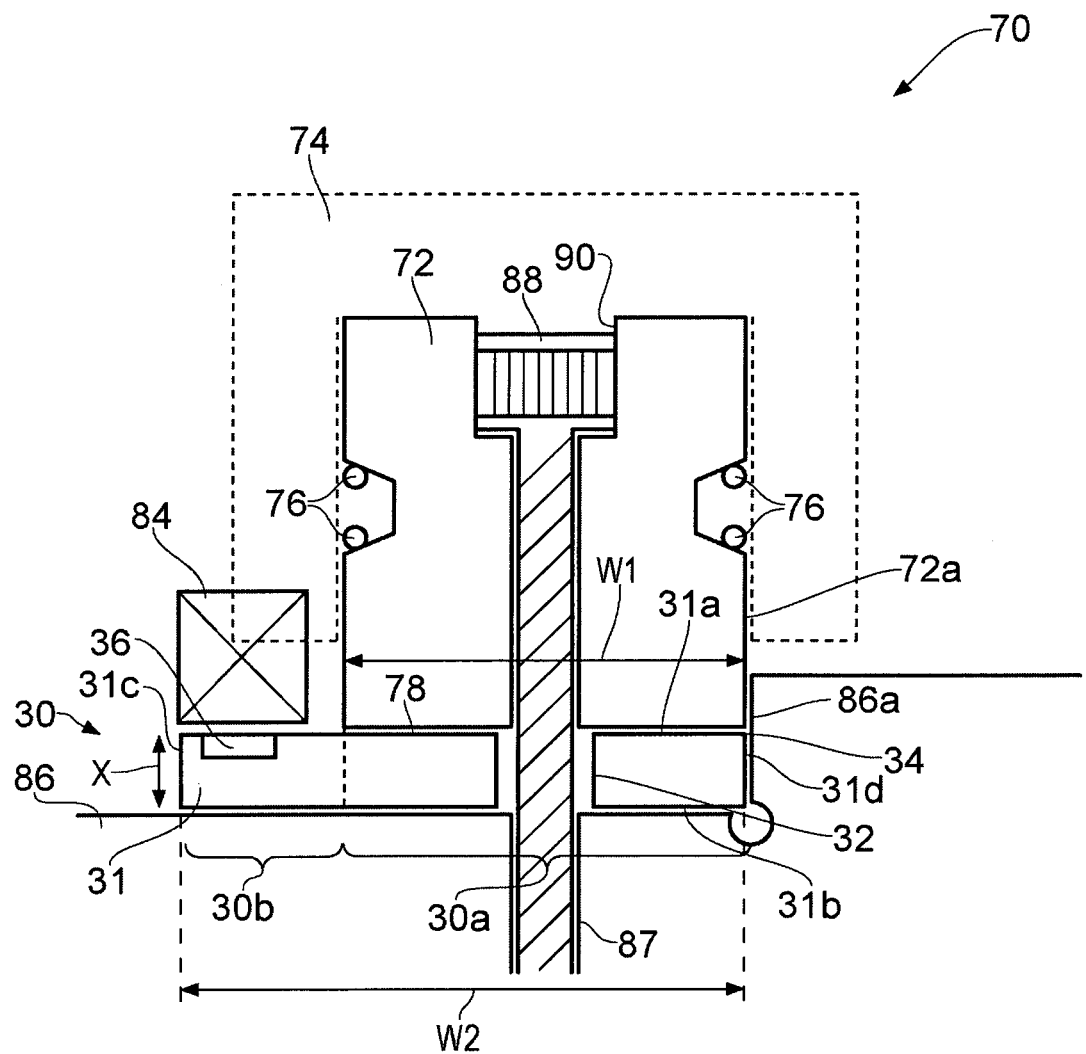
FIG. 3 shows a cross-section though an encoder scale and a guide assembly mounted on a machine tool.

FIG. 3 shows a cross-section though an encoder scale 30 and a guide assembly 70 mounted on a machine tool bed 86. The machine tool bed 86 is provided with a groove edge 86a against which a datum edge 34 of an encoder scale 30 and/or a first surface 72a of the guide rail 72 can be positioned. A line of spaced bolt holes 87 are provided in the machine tool bed 86, the line running substantially parallel to the groove edge 86a.

The guide assembly 70 comprises an elongate guide rail 72 and a guide carriage 74 mounted over the guide rail 72 and displaceable along the length of the guide rail 72 on roller or ball elements 76. The guide rail 72 has a mounting surface 78 defining the length and width W1 of the guide rail 72 and a first surface 72a, substantially perpendicular to the mounting surface 78, extending along the length of the guide rail 72. The guide rail 72 is provided with a plurality of bolt holes 90 spaced apart along its length by distances corresponding to the distance between the bolt holes 87 in the machine tool bed 86.

The encoder scale 30, as described with reference to FIGS. 2a and 2b, comprises an elongate scale member 31 having substantially parallel upper and lower faces 31a,b, defining the length and width W2 of the scale member 31, a scale track 36 comprising scale markings being provided on the upper face 31a; and side faces 31c,31d, defining the length and thickness X of the scale member 31. One longitudinal edge of the scale member 31 acts as a datum edge 34. A plurality of bolt holes 32 are provided through the scale member 31, spaced apart along its length; the bolt holes 32 in the scale member 31 are spaced to correspond with the bolt holes 90 in the guide rail 72 and the bolt holes 87 in the machine tool bed 86.

During installation the encoder scale 30 and guide rail 72 are mounted on the machine tool bed 86. First, the datum edge 34 of the scale member 31 is positioned against the groove edge 86a of the machine tool bed 86, the bolt holes 32 of the encoder scale 30 being aligned with the bolt holes 87 in the machine tool bed 86. In this position the lower face 31b of the scale member 31 contacts the bed 86 of the machine tool along the entire length of the encoder scale 30. As the upper and lower faces 31a,b of the scale member 31 are parallel, and thus a uniform distance X apart along the length of the encoder scale 30, the position of the upper face 31a of the scale member 31 is therefore known relative to the position of the machine tool bed 86.

The guide rail 72 is then positioned on the upper face 31a of the encoder scale 30, the first edge 72a of the guide rail positioned against the groove edge 86a of the machine tool bed 86. The width W1 of the guide rail 72 is less that the width W2 of the scale member 31 such that the guide rail 72 sandwiches a first part 30a of the encoder scale 30 between the guide rail 72 and the machine tool bed 86. A second part 30b of the encoder scale 30, on which the scale track 36 is provided, protrudes from under the guide rail 72 such that the scale markings 36a can be accessed to be sensed by a readhead 84 mounted on the guide carriage 74. In order to fix the encoder scale 30 and guide rail 72 to the machine tool bed 86 bolts 88 are passed through the bolt holes 90,32 and into correspondingly spaced holes 87 in the bed 86. The encoder scale 30 is manufactured such that when it is positioned between the guide rail 72 and the machine tool bed 86 the scale member protrudes from beneath the guide rail.

It will be understood that if an encoder scale used has a coiled storage position, the scale may be uncoiled and laid down onto the machine tool bed before securing the guide rail on top of it. By positioning the guide rail on top of a portion of the scale the weight of the guide rail helps to flatten the scale along its length; bolting the guide rail to the machine tool, the scale held between the two, can enhance the flattening effect of the guide rail.

The dimensions of the guide assembly 70 are known; due to the uniform thickness X of the scale member 31 the position of the guide assembly 70 can be thus determined relative to the machine tool bed 86. As machine tool beds are generally flat, and the scale member 31 is a fixed thickness, the surface of the scale member 31 on which the scale markings 36a are made should also be flat. As the dimensions of the guide rail 72 and guide carriage 74 are known and fixed along the length of the guide rail 72, a readhead 84 supported on the guide carriage 74 is provided at a fixed known distance from the machine tool bed 86 and a fixed known distance from the surface of the scale member 31 on which the scale markings are made. Providing the readhead 84 at a fixed distance from the scale markings 36a along the length of the scale track 36 enables accurate measurements of the displacement between the scale 36 and the readhead 84 to be obtained.

A readhead 84 containing a sensor (not shown) for sensing the scale markings (of the scale track 36) on the encoder scale 30 is mounted to the guide carriage 74. In order to set the height of the readhead 84 relative to the scale markings 82 a spacer (not shown) is positioned between the scale markings and the readhead 84 whilst the readhead 84 is secured to the guide carriage 74. In use, the guide carriage 74 is moved relative to the guide rail 72, along the length of the guide rail 72, such that the readhead 84 is moved relative to the scale markings 82 on the encoder scale 80.

Figure 4A:
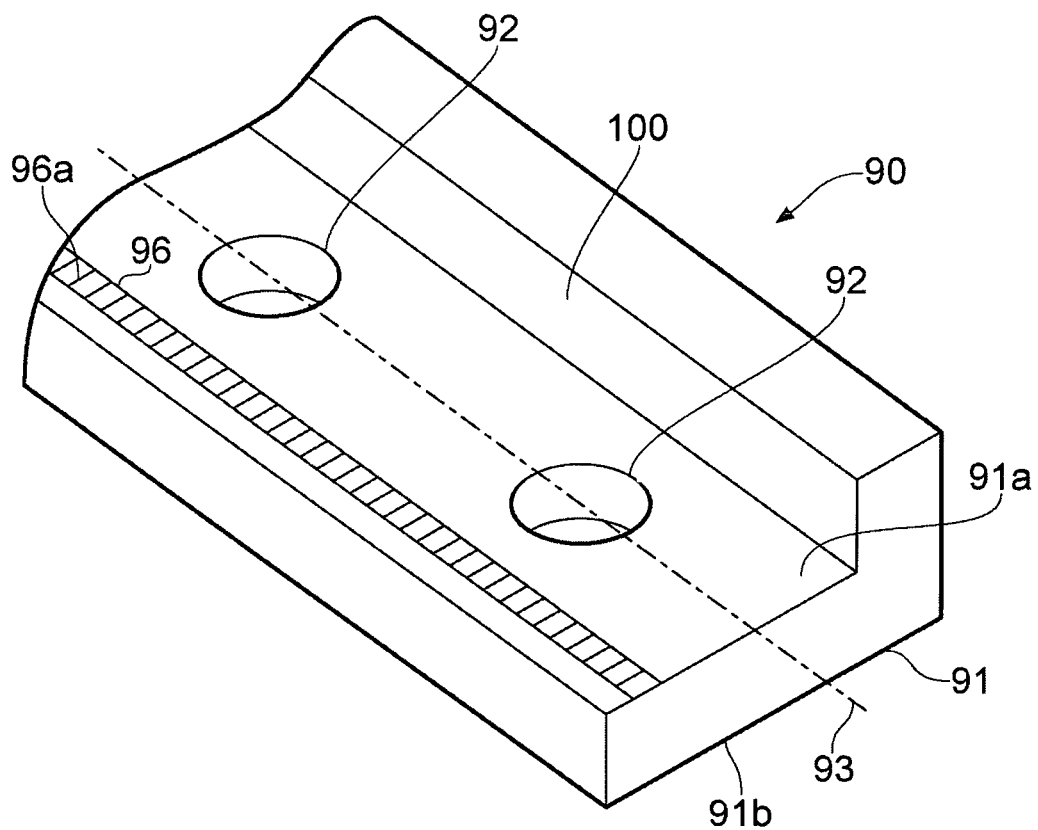
FIG. 4a shows an isometric view of an encoder scale having a raised edge for positioning a guide rail relative to the encoder scale and FIG. 4b shows a cross-section through the encoder scale of FIG. 4a and a guide assembly mounted on a machine tool.
Figure 4B:
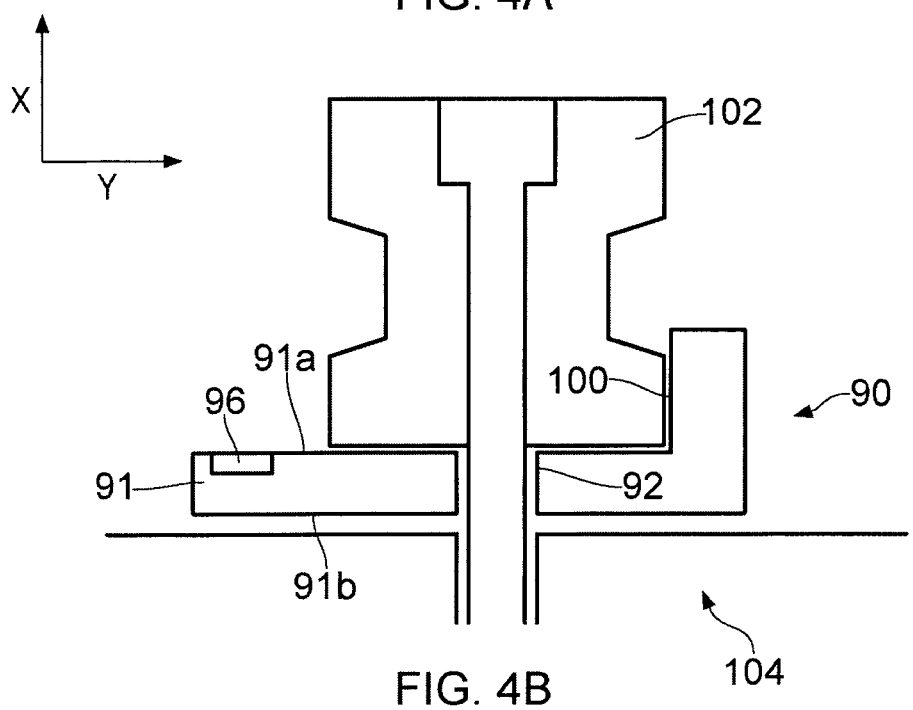

FIG. 4a shows an isometric view of an encoder scale 90 having a raised edge portion 100 for positioning a guide rail relative to the encoder scale 90. FIG. 4b shows a cross-section through the encoder scale 90 of FIG. 4a and a guide rail 102 mounted on a machine tool bed 104. The encoder scale 90 comprises an elongate scale member 91 having two large parallel faces, shown in the figure as upper and lower faces 91a,b respectively; bolt holes 92 through the scale member 91, the bolt holes 92 arranged along a notional centreline 93 of the scale member 91; a raised edge portion 100; and a scale track 96 comprising scale markings 96a. The scale track 96 is provided on the upper face 91a of the scale member 91, offset to a first side of the bolt holes 92, the raised edge portion 100 being provided on the opposite side of the bolt holes to the scale track 96.

The raised edge portion 100 provides an edge against which a guide rail 102 may be positioned in use, as in FIG. 4b. In this way the position of the guide rail 102 is accurately known relative to the machine tool bed 104 and the scale track 96 in the x direction, and also relative to the scale track 96 in the y direction. The advantage of knowing the position of the guide rail 102 relative to the scale track 96 in the y direction is that the position of the readhead (supported on the guide carriage which is in turn supported on the guide rail) can then be fixed relative to the scale markings in the y direction. By making sure that the readhead does not wander from the scale in the y direction (known as yawing) measurements of the relative positions of the readhead and the scale can be obtained more accurately.

When using a scale member without a raised edge position the relative positions of the guide rail and the scale member can be fixed by abutting both the guide rail and the scale member up against a groove edge in the machine tool bed, as shown in FIG. 3.

Figure 5:
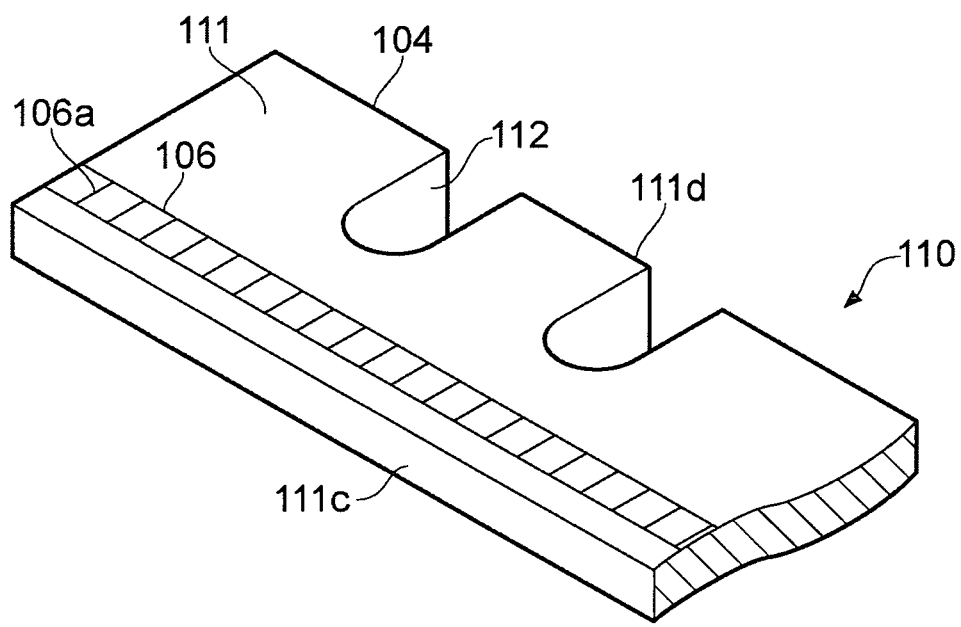
FIG. 5 shows an isometric view of an encoder scale with mounting slots.

FIG. 5 shows an isometric view of an encoder scale 110 with mounting slots 112 instead of bolt holes or other mounting holes as shown in the previous figures. A scale track 106 is provided towards a first edge 111c of the scale member 111 and the mounting slots 112 extend in from a second edge 111d of the scale member 111. The mounting slots 112 enable the encoder scale to be more easily retrofitted to a machine tool bed, under a guide rail assembly. In the case where a guide rail assembly is already mounted to a machine tool bed the bolts securing the guide rail to the bed of the machine tool may be loosened, the guide rail lifted, and the encoder scale 110 slid under the guide rail, the mounting slots 112 fitting around the bolts. The bolts may then be tightened to secure the encoder scale in place between the machine tool bed and the guide rail.

The scale tracks shown in each of FIGS. 2-5 are passive magnetic scale tracks, made by etching into the scale member. Etching into the scale member may for example include laser etching, chemical etching, mechanical etching, or a combination. As an alternative to etching the scale markings may be made, for example, by adding material to the scale member in order to form plateaus and grooves. It will be understood that any other type of scale track may replace the passive magnetic scale track, for example an active magnetic, optical, capacitive or inductive scale track. Scale markings of such scale tracks may be made in known ways. Additionally, it will be understood that the scale markings may be provided on the scale member in an arrangement other than in a track. In use, the appropriate sensor for sensing the scale markings can be provided on the guide carriage of the guide assembly.

Passive magnetic scale tracks can be advantageous in machine tool environments as they are robust; measurements can still be obtained in spite of any dirt or coolant, for example, present on the scale surface. Additionally, even if the surface of the magnetic scale is scratched, for example by swarf, accurate measurements can still be obtained. Seals, such as lip seals, may be provided on the readhead to wipe any debris off the scale as the readhead passes over the scale, such that the sensor of the readhead can sense the scale without debris getting in the way. A 'wet-readhead' may be provided as described in WO02/25219, in this case the readhead may be provided with a window and a wiper element in front of the window in the direction of travel of the readhead.

Figure 6:
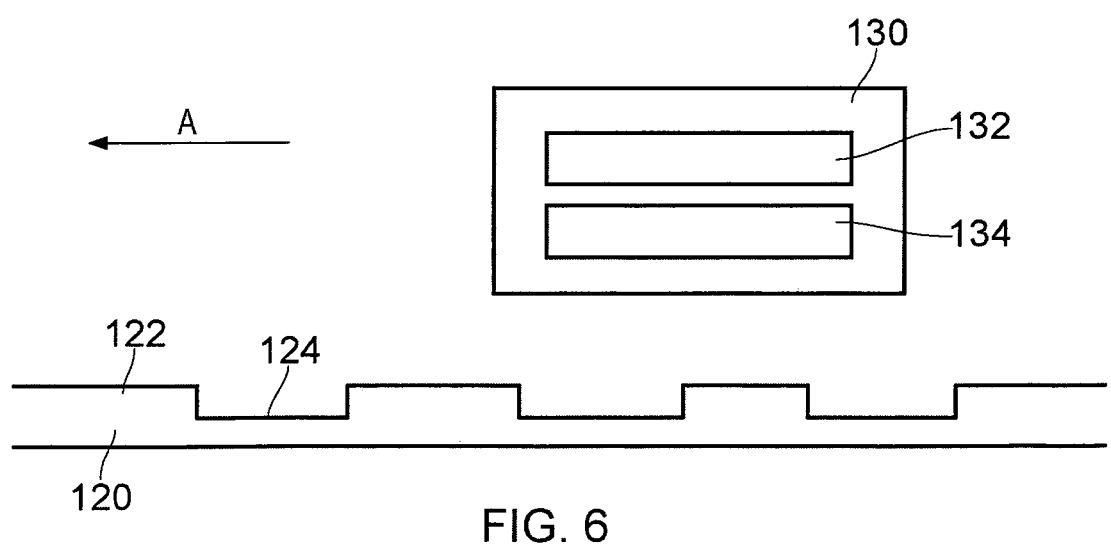
FIG. 6 shows a profile view along a length of passive magnetic scale.

FIG. 6 shows a profile view along a length of passive magnetic scale 120, and a cross-section through a sensor 130 for sensing the scale; the scale has incremental scale markings formed by alternating grooves 124 and plateaus 122 arranged along its length. The passive magnetic scale 120 is made from ferritic grades of stainless steel. The scale can alternatively be made from any magnetic material, such as carbon steel or pure iron, or a mix of magnetic materials.

A sensor 130 for sensing the passive magnetic scale 120 comprises a permanent magnet 132 and a Hall element 134. When the sensor 130 is positioned above the scale 120, in use, the magnetic field density is measured by the Hall element 134; as the sensor 130 is moved along the length of the scale 120, in the direction of the arrow A, the measured magnetic field density varies along the length of the encoder scale member. The predominant reason for this variation in measured magnetic field density is the variation in distance between the permanent magnet and the magnetic material of the scale. A secondary reason for this effect is the amount of magnetic material provided proximate to the sensor. As the Hall element passes over a plateau 122 the sensed magnetic field density increases, and as the Hall element passes over a groove 124 the sensed magnetic field density decreases.

In order to maximise the variation in the measured magnetic field density from a position above a plateau 122 to a position above a groove 124 the sensor 130 must be accurately positioned as closely as possible to the scale.

It will be understood that Giant Magnetoresistive sensors (GMR) or Anisotropic Magnetoresistive sensors (AMR), or multiple Hall elements may replace the Hall element 134 described.

Figure 7:
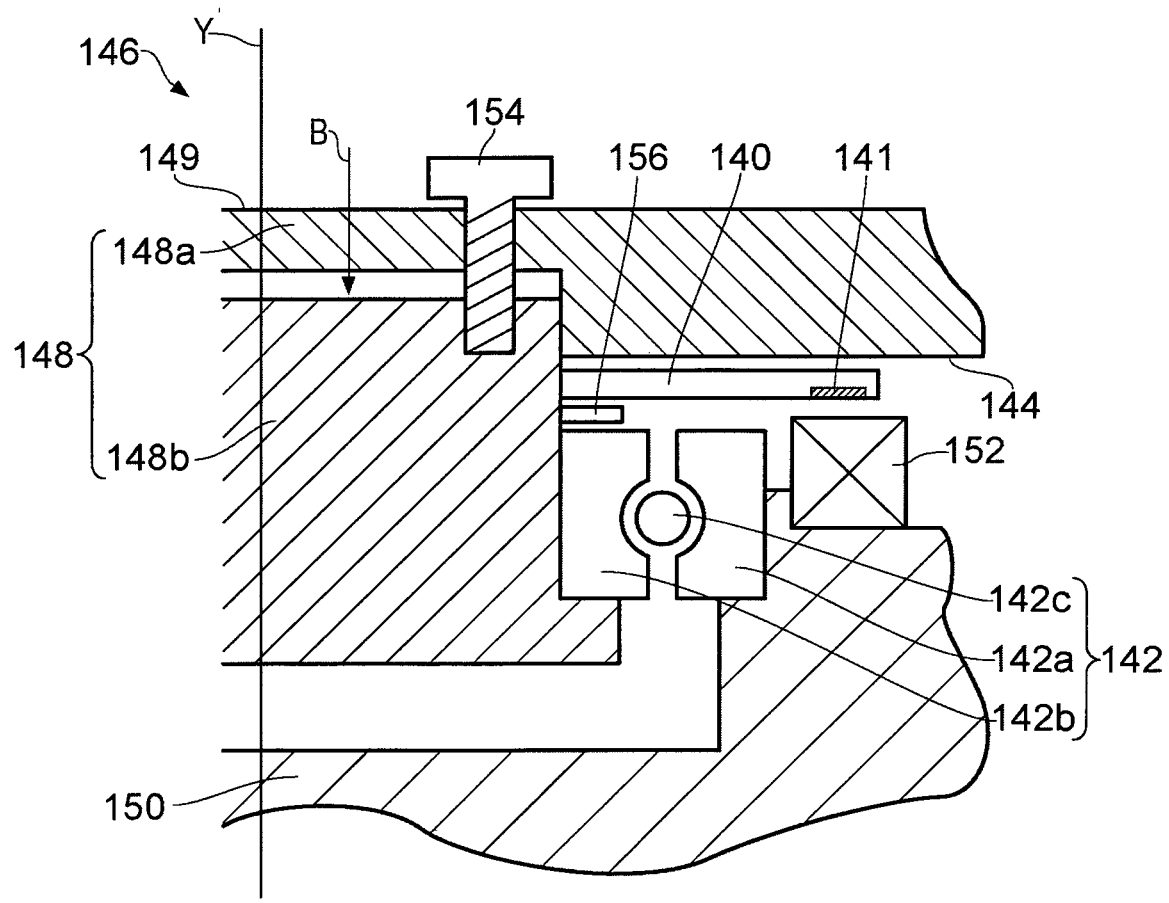
FIG. 7 shows a cross-section through a rotary encoder mounted to a machine part using a bearing.

FIG. 7 shows a cross-section through a rotary encoder scale member 140 mounted between a bearing 142, the bearing comprising stationary 142a and moveable 142b raceways and ball bearings 142c, and a mounting surface 144 of a machine 146. The machine comprises a stationary assembly 150 and a rotatable assembly 148, having first 148a and second 148b components, which is rotatable about an axis Y. A readhead 152 is provided for reading scale markings 141 provided on the rotary encoder scale member 140.

The stationary assembly 150 supports the readhead 152 and the stationary raceway 142a of the bearing assembly 142. Attached to the moveable raceway 142b by a bolt 154 is the rotatable assembly 148 of the machine 146. The encoder scale member 140 is positioned between the moveable raceway 142b of the bearing 142 and a mounting surface 144 of the rotatable assembly 148 such that when the bolt 154 is tightened the first component 148a of the rotatable assembly 148 is drawn towards the second component 148b in the direction of arrow B, clamping the encoder scale member 140 between the moveable raceway 142b of the bearing 142 and the mounting surface 144 of the rotatable assembly 148. In this embodiment a shim 156 is provided between the moveable raceway 142b of the bearing 142 and the encoder scale member 140 such that the encoder scale member 140 is spaced from the stationary raceway 142a of the bearing 142.

The scale markings 141 are provided on the encoder scale member 140 such that they are sensable by the readhead 152. The rotation of the rotatable assembly 148 can be measured by the readhead 152 reading the scale markings 141 as they are moved relative to the readhead 152.

The machine 146 may be a coordinate positioning apparatus for accurately positioning an object mounted on the rotatable assembly 148 relative to the stationary assembly 150. Said object may be mounted to an outer surface 149 of the rotatable assembly 148.

It will be understood by the skilled person that all of the embodiments described may be provided in any orientation. It will also be understood that the scale member may be mounted to either the moveable or stationary member of the apparatus, the sensor being mounted to the other of the moveable or stationary members such that the scale and sensor are relatively moveable.

The invention claimed is:

1. A coordinate positioning apparatus comprising:
a mounting surface;
a motion guide mountable on the mounting surface;
a first member comprising a sensor configured to sense scale markings, the first member being mountable on the motion guide so as to be movable with respect to the motion guide while mounted; and
an encoder scale member comprising a first set of scale markings that are, in use, sensable by the sensor, wherein at least part of the encoder scale member is retained between the mounting surface and the motion guide by being sandwiched therebetween, and the encoder scale member is supported by the mounting surface at least in the vicinity of the first set of scale markings.

2. An apparatus according to claim 1, wherein the encoder scale member comprises at least one mounting feature that allows the encoder scale member to be attached to the mounting surface of the coordinate positioning apparatus.

3. An apparatus according to claim 2, wherein the at least one mounting feature comprises at least one mounting hole.

4. An apparatus according to claim 2, wherein the at least one mounting feature comprises at least one mounting slot.

5. An apparatus according to claim 1, wherein the motion guide comprises at least one mounting feature.

6. An apparatus according to claim 5,
wherein the encoder scale member comprises at least one mounting feature, and
wherein at least one attachment part is provided, the at least one attachment part being cooperable with the at least one mounting feature on the encoder scale member and with the at least one mounting feature on the motion guide to fix the encoder scale member and the motion guide to the mounting surface of the coordinate positioning apparatus.

7. An apparatus according to claim 1,
wherein the encoder scale member has first and second opposing faces, and
wherein the first face is supported by the mounting surface and at least part of the second face contacts the motion guide.

8. An apparatus according to claim 7, wherein the first face is substantially parallel to the second face.

9. An apparatus according to claim 7, wherein the first set of scale markings are provided on at least the second face.

10. An apparatus according to claim 1, wherein the first set of scale markings are arranged to form at least one scale track.

11. An apparatus according to claim 1, wherein the first set of scale markings are magnetic scale markings.

12. An apparatus according to claim 1, wherein the encoder scale member is a linear encoder scale member.

13. An apparatus according to claim 1, wherein the encoder scale member has a radius of curvature.

14. An apparatus according to claim 1, wherein the coordinate positioning apparatus is a machine tool.

15. An apparatus according to claim 1, wherein the motion guide comprises a guide rail.

16. An apparatus according to claim 15, wherein the first member comprises a guide carriage.

17. An apparatus according to claim 1, wherein the motion guide comprises a bearing.

18. An encoder scale member configured to be used with a coordinate positioning apparatus comprising a mounting surface, a motion guide mountable on the mounting surface, and a first member comprising a sensor configured to sense scale markings, the first member being mountable on the motion guide so as to be moveable with respect to the motion guide while mounted, the encoder scale member comprising:
a first set of scale markings that are, in use, sensable by the sensor; and
at least one mounting feature that allows at least part of the encoder scale member to be fixed between the mounting surface and the motion guide by being sandwiched therebetween, and allows the encoder scale member to be supported by the mounting surface at least in the vicinity of the first set of scale markings.

19. An encoder scale member according to claim 18, wherein at least one attachment part is provided, the attachment part being cooperable with the at least one mounting feature to fix the at least part of the encoder scale member between an associated mounting surface and a motion guide.

20. An encoder scale member according to claim 19, wherein the at least one mounting feature comprises at least one mounting hole configured to receive the at least one attachment part.

21. An encoder scale member according to claim 19, wherein the at least one mounting feature comprises at least one mounting slot configured to fit around the at least one attachment part.

22. An encoder scale member according to claim 18, wherein the encoder scale member has first and second opposing faces.

23. An encoder scale member according to claim 22, wherein the first face is substantially parallel to the second face.

24. An encoder scale member according to claim 22, wherein the first set of scale markings are provided on at least one of the first and second faces.

25. An encoder scale member according to claim 18, wherein the first set of scale markings are arranged to form at least one scale track.

26. An encoder scale member according to claim 18, wherein the first set of scale markings are magnetic scale markings.

27. An encoder scale member according to claim 18, wherein the encoder scale member is a linear encoder scale member.

28. An encoder scale member according to claim 18, wherein the encoder scale member has a radius of curvature.

29. A method for mounting an encoder scale member to a coordinate positioning apparatus comprising a mounting surface, a motion guide mountable on the mounting surface, and a first member comprising a sensor configured to sense scale markings, the first member being mountable on the motion guide so as to be movable with respect to the motion guide while mounted, the encoder scale member comprising a first set of scale markings that are, in use, sensable by the sensor, the method comprising the steps of:
(i) taking the mounting surface, motion guide, and encoder scale member; and
(ii) sandwiching at least part of the encoder scale member between the mounting surface and the motion guide to retain the encoder scale member therebetween such that the encoder scale member is supported by the mounting surface at least in the vicinity of the first set of scale markings.

30. A method according to claim 29, wherein the step of sandwiching further comprises the steps of:
(i) positioning the encoder scale member on the mounting surface of the coordinate positioning apparatus such that the encoder scale member is supported by the mounting surface at least in the vicinity of the first set of scale markings; and
(ii) positioning the motion guide on the encoder scale member such that the at least part of the encoder scale member lies between the motion guide and the mounting surface of the coordinate positioning apparatus.

31. A method according to claim 30,
wherein the encoder scale member is a coiled encoder scale member, and
wherein the step of positioning the encoder scale member comprises uncoiling the encoder scale member and laying it on the mounting surface.

32. A method according to claim 29, wherein the method comprises the additional step of fixing the motion guide and the encoder scale member to the mounting surface of the coordinate positioning apparatus.

33. A method according to claim 32, wherein the mounting surface, motion guide, and encoder scale member each comprise mounting holes, and
wherein the step of fixing the motion guide and the encoder scale member comprises bolting the motion guide and the encoder scale member to the mounting surface of the coordinate positioning apparatus.

34. A method according to claim 29, comprising the initial step of releasably fixing the motion guide to the mounting surface of the coordinate positioning apparatus.

35. A method according to claim 34, wherein the step of sandwiching further comprises the steps of:
(i) at least partially releasing the motion guide from the mounting surface of the coordinate positioning apparatus; and
(ii) at least partially separating the motion guide from the mounting surface of the coordinate positioning apparatus.

36. A method according to claim 35, further comprising the step of re-fixing the motion guide to the mounting surface of the coordinate positioning apparatus.

37. A method according to claim 34, wherein the motion guide is releasably fixed to the mounting surface of the coordinate positioning apparatus with at least one attachment part.

38. A method according to claim 37, wherein the encoder scale member comprises at least one mounting slot configured to fit around the at least one attachment part.

39. A method according to claim 29, wherein the motion guide comprises a guide rail.

40. A method according to claim 39, wherein the first member comprises a guide carriage.

41. A method according to claim 29, wherein the motion guide comprises a bearing.

42. A method according to claim 29, wherein the coordinate positioning apparatus is a machine tool.

43. A coordinate positioning apparatus comprising:
a mounting surface;
a motion guide mountable on the mounting surface;
a first member configured to support a sensor configured to sense scale markings, the first member being mountable on the motion guide so as to be movable with respect to the motion guide while mounted; and
an encoder scale member comprising scale markings,
wherein at least part of the encoder scale member is retained between the mounting surface and the motion guide by being sandwiched therebetween, and
wherein a substantial part of the encoder scale member is supported by the mounting surface.

44. A coordinate positioning apparatus according to claim 43, wherein the coordinate positioning apparatus is a machine tool.

* * * * *